United States Patent [19]

Giannone

[11] 4,438,314

[45] Mar. 20, 1984

[54] WELD PIN APPLICATOR DEVICE HAVING AUTOMATIC RELOAD

[75] Inventor: Charles Giannone, Babylon, N.Y.

[73] Assignee: Duro-Dyne Corporation, Farmingdale, N.Y.

[21] Appl. No.: 367,247

[22] Filed: Apr. 12, 1982

[51] Int. Cl.³ .............................................. B23K 9/20
[52] U.S. Cl. ...................................... 219/98; 219/103
[58] Field of Search ........................... 219/98, 99, 103

[56] References Cited

U.S. PATENT DOCUMENTS 3,531,618  9/1970  Merchant ............................. 219/103
3,835,285  9/1974  Hinden et al. ......................... 219/98

*Primary Examiner*—B. A. Reynolds
*Assistant Examiner*—Alfred S. Keve
*Attorney, Agent, or Firm*—Mark T. Basseches; Paula T. Basseches

[57] ABSTRACT

The present invention is directed to an apparatus for attaching welding pins to sheet metal, and particularly for attaching by a resistance welding procedure pins for retaining insulating material to a duct substrate. A characterizing feature of the invention resides in the provision of a fixed hopper member for receiving bulk quantities of weld pins and a carriage movable relative to the hopper for enabling the pins to be applied to the duct at spaced points, the combination including means for discharging a plurality of oriented pins from the bulk supply hopper to the movable carriage responsive to predetermined movement of the carriage.

8 Claims, 7 Drawing Figures

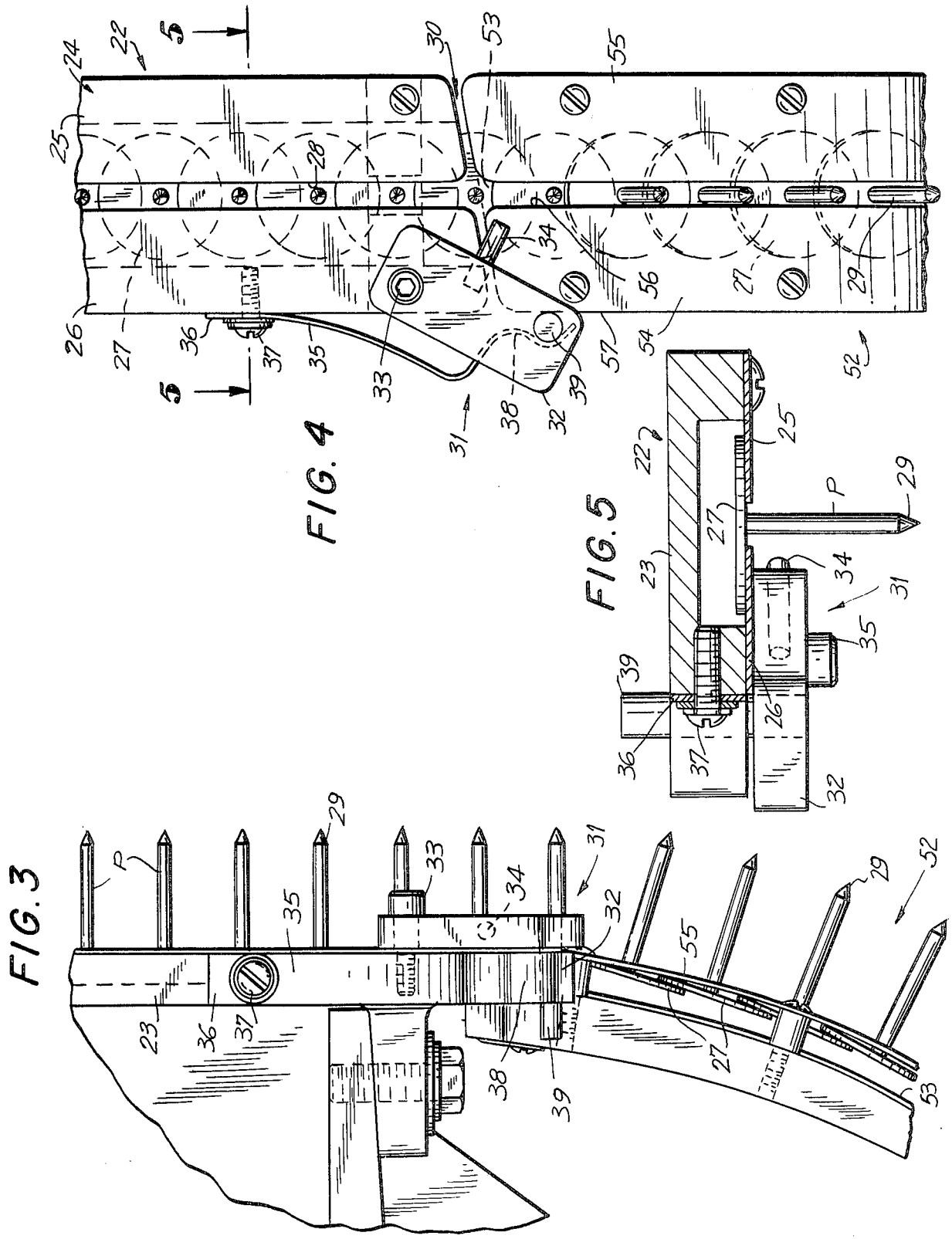

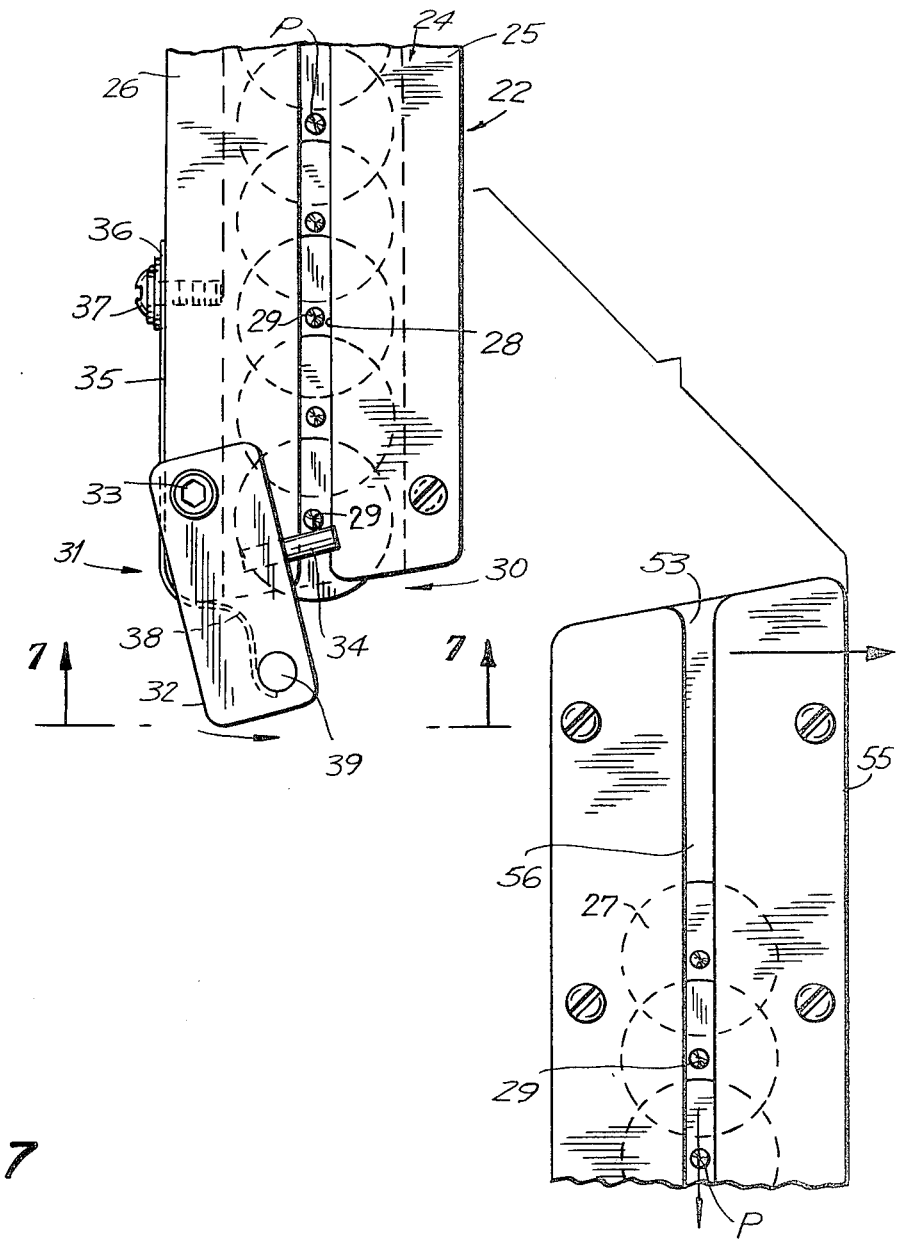
FIG. 6
FIG. 7
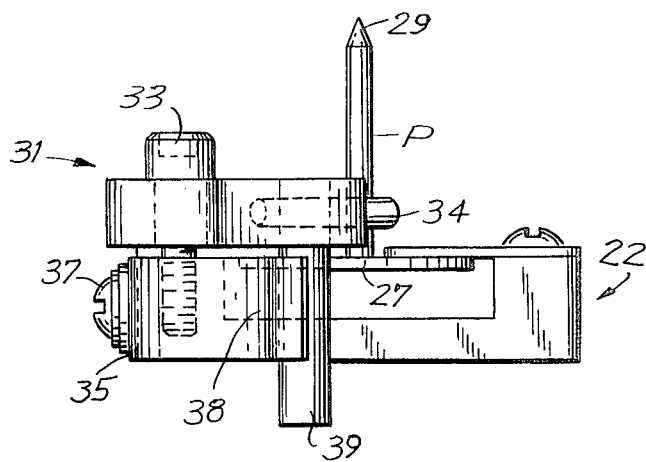

WELD PIN APPLICATOR DEVICE HAVING AUTOMATIC RELOAD

BACKGROUND OF THE INVENTION

1. Field of the Invention

The present invention is in the field of welding devices and pertains more particularly to an apparatus for applying welding pins to ducting, the pins functioning to secure insulating batts to the surface of the duct.

2. The Prior Art

The current practice in installations employing air conduits for the feeding of cooled or heated air involves the lining of the ducting for such air with batts or layers of insulating materials. Typically, the insulating materials which line the interior of the duct are secured to the surface of sheet metal members which are subsequently formed into the duct configuration.

In accordance with a preferred method, the batts of insulating are glued to the duct surface and, as assurance against dislodgement of the batts, a plurality of pins having enlarged heads are passed through the batts into the sheet metal of the duct and weldingly connected to the metal. Various aspects of the attachment procedures and mechanisms for effecting the same are shown in U.S. Pat. Nos. 4,031,350; 3,858,024; 3,835,285; 3,624,340; 3,591,763; 3,591,762 and 3,582,603, all of the above patents being owned by the assignee hereof.

In U.S. Pat. No. 3,858,024 noted above, there is shown a gang welding apparatus whereby a plurality of welding pins are attached simultaneously at transversely displaced positions across the width of a sheet metal member. While devices in accordance with the subject patent have receiver commercial acceptance, there are drawbacks involved in the use thereof.

Particularly, the initial expense is relatively high due to the fact that multiple welding heads are provided, each of which must have its own associated transformer, etc. Additionally, once a device in accordance with the subject patent is set up, the displacement of the pins is fixed. If it is desired to revise the spacing of the pins, as would be the case where a different width of duct material is processed, each of the welding heads must be relocated.

It will thus be recognized that the device in accordance with the subject patent is useful principally where long production runs of a given size duct material will be encountered.

SUMMARY OF THE INVENTION

With the foregoing in mind, the present invention may be summarized as directed to an improved welding apparatus readily adaptable for a wide variety of production run sizes which provides great flexibility in that the spacing between weld pins may be varied.

The apparatus includes an elongate ground electrode upon which the duct material is adapted to rest, a beam in parallel spaced relation to the ground electrode, and a carriage member movably mounted on the beam, the pins being attached in accordance with the position of the carriage relative to the beam.

A characterizing feature of the device resides in the provision of an orienting hopper, known per se, which is fixed to the beam, the hopper including an out-feed track which is continuously loaded with properly oriented pins. A stop mechanism precludes the pins from falling clear of the out-feed track.

The carriage includes an in-feed track leading to the weld head, the in-feed track being of sufficient length to hold a plurality of pins in number exceeding the number which will be applied during a given pass or welding sequence across the width of the duct. When the carriage is shifted to a predetermined forward or loading position, the two track sections are disposed in alignment and means are provided for releasing oriented pins from the hopper track section to the carriage track section, whereby the supply of pins moving with the carriage is automatically replenished.

It is accordingly an object of the invention to provide an improved welding apparatus for affixing weld pins at selected spaced points across the width of a duct component.

A further object of the invention is the provision of a device of the type described wherein the welding electrode is mounted on a moving carriage. An orienting hopper is secured in fixed position and means are provided for replenishing the supply of pins carried by the carriage responsive to movement of the carriage to a predetermined position relative to the hopper.

To attain these objects and such further objects as may appear herein or be hereinafter pointed out, reference is made to the accompanying drawings forming a part hereof, in which:

FIG. 3 is a further magnified front elevational view of portions of the device between the arrows 3—3 of FIG. 2;

FIG. 4 is a side elevational view of the portion of the apparatus illustrated in FIG. 3;

FIG. 5 is a horizontal section taken on the line 5—5 of FIG. 4;

FIG. 6 is a view similar to FIG. 5 showing the position of the parts when the carriage member has been moved away from the forwardmost position illustrated in FIG. 4;

FIG. 7 is a bottom plan view taken in the direction of the arrows 7—7 of FIG. 6.

Figure 1:
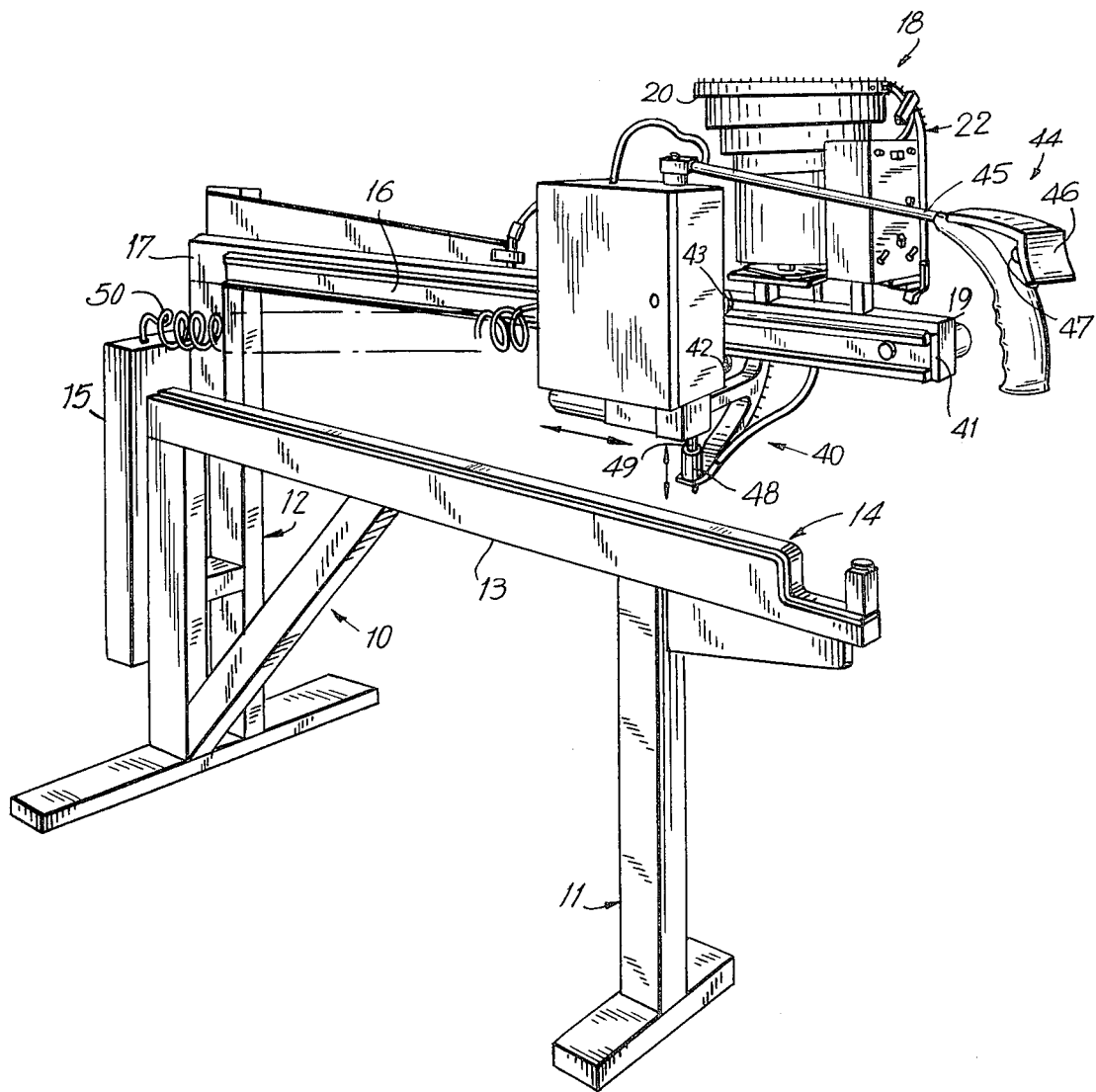
FIG. 1 is a perspective view of a welding apparatus in accordance with the invention.

Turning now to the drawings, there is disclosed in FIG. 1 a welding apparatus in accordance with the invention, the apparatus including a frame member 10 having support legs 11 and 12. A horizontally directed ledge portion 13 defines on its uppermost surface an elongate ground electrode 14 connected to the ground circuit of the welding transformer 15. A horizontally directed trolley beam 16 is secured to support pillar 17 forming a rear component of the frame. The trolley beam 16 is in parallel spaced relation to the ground electrode 14.

A vibratory orienting parts feeder 18, known per se, is mounted adjacent the front or outermost end 19 of the beam 16. A suitable feeder is manufactured by Automation Devices, Fairview, Pa. and identified as Model #8. The orienting apparatus functions to receive a multiplicity of welding pins P and by imparting a vibratory motion to a spiral track 20 induces the pins to advance in helical columns from a central bulk supply chamber to the lead or upper end 21 of an upper track assembly 22 fixed to the hopper.

Figure 2:
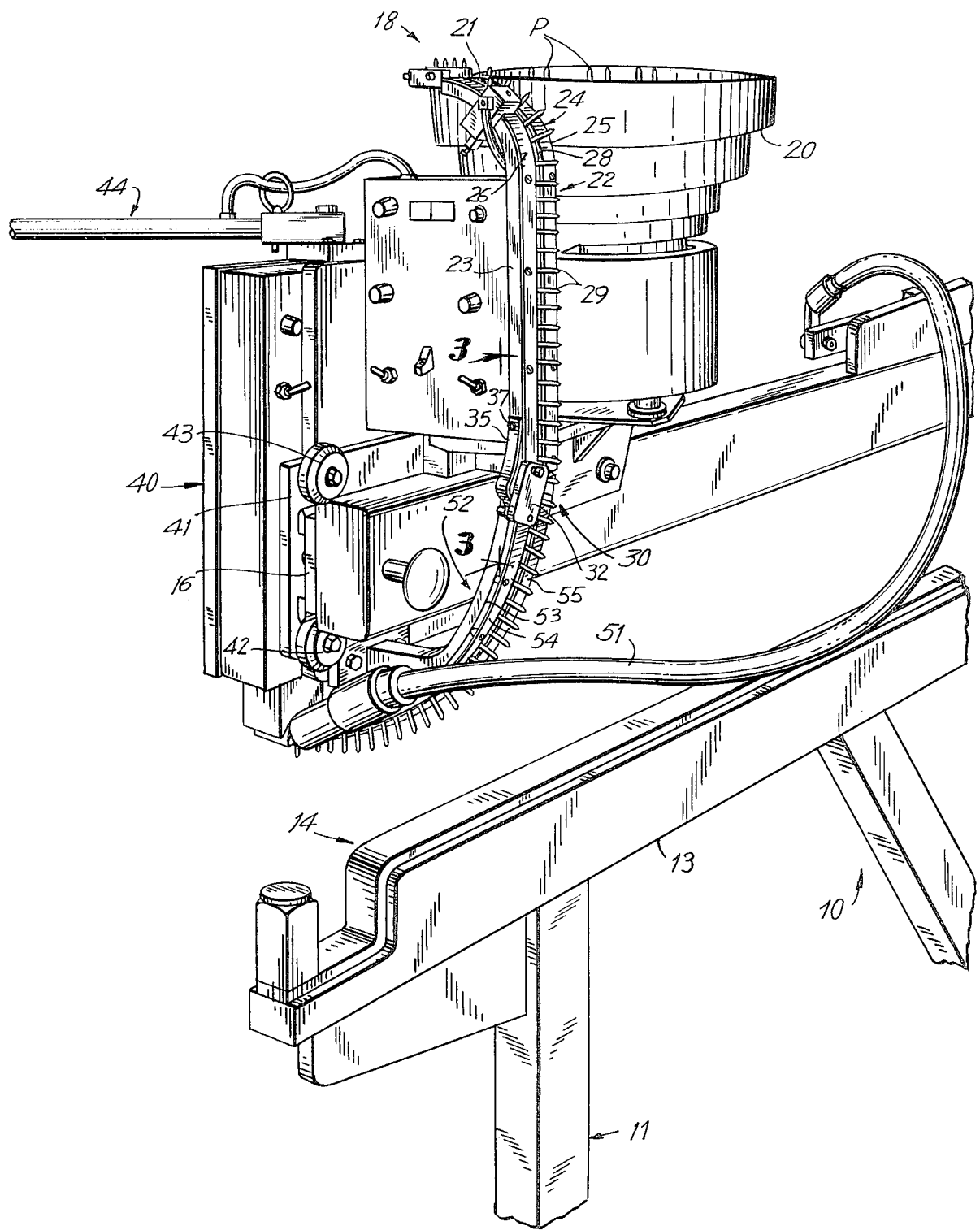
FIG. 2 is a magnified perspective view showing the opposite side of the apparatus from that shown in FIG. 1.

As most readily apparent from FIGS. 2 and 3, the upper track assembly 22 includes a back plate 23 and a front wall portion 24, the front wall portion being defined by guide plates 25, 26. The plates 25, 26 are spaced forwardly from the back plate 23 in a manner known per se to provide clearance for the heads 27 of the weld pins P.

Additionally, a longitudinally directed slot or channel 28 is formed between the plates 25, 26, the channel 28 providing a clearanceway for the shank portions 29 of the pins P.

As is known, activation of the feeder 18 will cause a constant supply of pins P to flow to the track assembly 22 from the bulk supply hopper, the pins P flowing down the track assembly until they reach the lower end of the track 30, defining a discharge station. The pins are normally blocked from flowing clear of the upper track section 22 by a pawl assembly 31 shown in blocking position in FIG. 6. The pawl assembly more particularly comprises a lever member 32, pivotally mounted on bolt 33 secured to the upper track section 22.

The lever 32 includes a cross pin 34 which is normally biased into blocking relation of the channel 28 by a leaf spring 35. More particularly, the leaf spring 35, which is fixed to the track section 22 at its upper end 36 by machine screw 37, includes a lower end portion 38 biased against stub shaft 39 fixed to the lower end of the lever 32.

The normal operating position of the pawl, which is shown in FIG. 6, thus precludes the passage downwardly to track 22 and out through discharge station 30 of the weld pins P by virtue of the cross pin 34 lying in the path of the shanks 29 of the pins P.

Mounted on the beam 16 for translatory motion therealong is a weld head assembly 40. The weld head assembly, as best seen in FIG. 2, includes a mounting plate 41 having fixed thereto one or more vertically displaced pairs of carriage wheels 42, 43. The welding head assembly includes an operating wand 44 comprising in essence an elongate rod 45 having at its forward or outermost end a trigger assembly 46. The trigger assembly includes a switch 47 which, when operated, energizes the welding apparatus through a pin applying cycle.

It will be observed that the operator, by proper manipulation of the member 46, is thus able both to shift the carriage 40 to a desired forward or rearward position along beam 16 and also to energize the welding apparatus when the desired position is achieved.

The weld head assembly includes an active or welding electrode 48 mounted on a piston member 49 controlled by an air cylinder assembly (not shown). A suitable assembly is disclosed in the above referenced U.S. Pat. No. 3,835,285. The electrode 48 includes on its under surface a permanent magnet structure which functions to support the head of a welding pin with the shank facing downwardly.

It is sufficient for an understanding of the present invention to note that upon activation of the trigger 47, the welding electrode having a pin secured to its underface in the manner aforesaid is shifted downwardly toward ground electrode 14 and when contact is made between the tip of the pin and the sheet metal component mounted atop the ground electrode, a welding circuit flows sufficient to effect a resistance weld between the pin and the sheet metal.

Details of the welding procedures are set forth in one or more of the above referenced patents and need not further be discussed. It will be noted, however, that an air supply for powering the piston 49 through its movement is provided through flexible hose 50 and welding current is supplied to the electrode 48 by welding cable 51.

Extending upwardly from a position adjacent the underface of the electrode 48 is a lower track section 52 which, in cross-sectional configuration, is similar to the upper section 22. That is to say, the track section 52 includes a back plate 53 and laterally spaced front plates 54, 55, defining a central channel 56 therebetween. The plates 54, 55 are spaced from the back plate 53 so as to provide a clearance area for the heads 27 of the pins P.

As is readily recognized from an inspection of the figures, and particularly FIGS. 3 to 6, the shanks 29 of the pins in the lower track section 52 project outwardly through slot 56. The pins are urged, under the influence of gravity, along an arcuate path defined by the track 52 in such manner that the lowermost pin in the track section underlies the magnetically equipped welding electrode 48. In the course of the welding cycle, the lowermost pin will be affixed in the manner aforesaid.

After removal of the now affixed welding pin, the series of pins disposed in the track section 52 is permitted to descend an increment until the next lower welding pin is held in blocking relation of the track by magnetic connection to the welding electrode.

It will be understood that a plurality of welding pins may be attached during a given operating pass along the beam 16, during which attachment procedure, as depicted in FIG. 6, the track section 52 will be out of registry with the upper track section 22. Thus, a series of welding pins will be exhausted from the lower track section 52.

It is a principal advance of the present invention that the lower track section 52 is replenished with pins automatically responsive to movement of the welding head assembly 40 to the forward limiting position thereof, illustrated in FIGS. 4 and 2. In such forward limiting position, the track sections 22 and 52 are in alignment and, thus, the clearance slots 28 and 56 for the pin shanks are in precise registry. Movement of the lower track section 52 into the registering position results in releasing of the pawl assembly 31 due to the engagement of the stub shaft 39 with the forward edge portion 57 of the lower track section.

With the parts oriented as shown in FIG. 4, a further supply of pins will drop into the lower track section. It will be further appreciated that immediately upon movement of the lower track section away from the forwardmost position as a result of a rearward shifting of the welding head assembly, the cross pin or blocking finger 34 of the pawl assembly will again intersect the clearance slot 28 in the upper track section 22, whereupon the passage of further pins will be prevented.

From the foregoing description it will be appreciated that there is disclosed in accordance with the present invention a novel welding assembly which includes a movably mounted welding head and a fixedly mounted bulk hopper. Responsive to a predetermined relative positioning of the head to the hopper, the supply of pins carried by the head is automatically replenished. It is thus possible to effect a plurality of welds across the surface of a web to be formed into a duct, the positioning of the welds being readily controlled by the operator. When the welding head is drawn forward, as for the start of the next series of weld cycles, a new sequence of pins oriented by the hopper is charged into a movable track section carried by the welding head.

As will be evident to those skilled in the art, numerous variations of details of construction may be made without departing from the spirit of the invention. Accordingly the same is to be broadly construed within the scope of the appended claims.

Having thus described the invention and illustrated its use, what is claimed as new and is desired to be secured by Letters Patent is:

1. Apparatus for the attachment by electrical resistance welding of a headed weld pin at any of a plurality of displaced positions across a duct or the like comprising a frame member having an elongate horizontal support surface defining a ground electrode, a carrier beam fixed to said frame at a position above and in parallel spaced relation to said electrode, a bulk weld pin hopper assembly mounted in fixed position on said beam, said assembly including means for orienting pins in said hopper, an upper track section depending from said hopper assembly having an upper end in pin receiving relation to said hopper and a lower end, said section being configured to support a plurality of said pins with the shank portions thereof projecting transversely beyond said track section, a pawl member movably mounted at said lower end of said section, means urging said pawl member into the path of the shanks of said pins, a carriage member mounted on said beam for movement longitudinally thereof between forward and rearward limiting positions, a weld electrode on said carriage adapted to shift weld pins fed thereto toward said ground electrode and weldingly connect the same to a duct member supported on said ground electrode, an upwardly extending lower track section adapted to support a multiplicity of pins connected to said weld head of said carriage, said lower section including a discharge station at the lower end thereof in pin feeding relation to said weld electrode, and a pin receiver station at the upper end thereof, said pin receiver station defining a continuation of said lower end of said upper track only in said forward limiting position of said carriage, and means for shifting said pawl clear of said path of said shanks responsive to movement of said carriage to said forward limiting position, thereby to permit flow of a stack of pins from said upper to said lower sections automatically when said carriage reaches said forwardmost position.

2. Apparatus in accordance with claim 1 wherein said means urging said pawl into said path comprises a spring.

3. Apparatus in accordance with claim 1 wherein said means for shifting said pawl clear of said path comprises a portion of said lower track section.

4. Apparatus in accordance with any preceding claim wherein said track sections comprise a back wall portion and a front wall portion, said front wall portion including a central slot through which said shanks project.

5. A weld pin attachment apparatus comprising a frame, an elongate, horizontally disposed ground electrode mounted on said frame, a carrier beam disposed above said electrode in parallel spaced relation thereto, a weld head assembly movably mounted on said beam and including a weld electrode shiftable toward and away from said ground electrode, upwardly directed receiver track means on said assembly for storing a plurality of pins and feeding same to said weld electrode, orienting hopper means on said frame for storing a supply of said pins and delivering same in oriented condition at a downwardly directed discharge station, stop means at said discharge station blocking downward flow of said pins from said station, and means on said receiver track means for clearing said stop means from said blocking position responsive to movement of said weld head assembly along said carrier beam to move said receiver track into registry with said discharge station, thereby to refill a stack of pins into said receiver track.

6. Apparatus in accordance with claim 5 wherein said stop means comprises a pawl, the combination including spring means urging said pawl to said blocking position.

7. Apparatus in accordance with claim 6 wherein said weld head assembly is shiftable between forward and rearward limiting positions on said beam, said receiver track being in registry with said discharge station in said forward limiting position of said head assembly.

8. Apparatus in accordance with claim 7 wherein said means for clearing said pawl from said blocking position comprises a portion of said receiver track.

* * * * *